(12) United States Patent
Ramirez et al.

(10) Patent No.: US 8,644,581 B2
(45) Date of Patent: Feb. 4, 2014

(54) SYSTEMS AND METHODS FOR CELLULAR ANALYSIS DATA PATTERN GLOBAL POSITIONING

(75) Inventors: Carlos A. Ramirez, Miami, FL (US); Jaesang Park, Miami, FL (US); Jiuliu Lu, Homestead, FL (US)

(73) Assignee: Beckman Coulter, Inc., Brea, CA (US)

( * ) Notice: Subject to any disclaimer, the term of this patent is extended or adjusted under 35 U.S.C. 154(b) by 761 days.

(21) Appl. No.: 12/608,781

(22) Filed: Oct. 29, 2009

(65) Prior Publication Data

US 2010/0111399 A1   May 6, 2010

Related U.S. Application Data

(60) Provisional application No. 61/111,078, filed on Nov. 4, 2008.

(51) Int. Cl.
*G06K 9/00* (2006.01)

(52) U.S. Cl.
USPC ............................. 382/133; 382/216

(58) Field of Classification Search
USPC .................................. 382/133, 216
See application file for complete search history.

(56) References Cited

U.S. PATENT DOCUMENTS

| | | | | |
|---|---|---|---|---|
| 6,005,977 A * | 12/1999 | Tanimizu et al. | ............. | 382/216 |
| 2005/0008212 A1 * | 1/2005 | Ewing et al. | ................... | 382/133 |
| 2005/0010108 A1 * | 1/2005 | Rahn et al. | .................... | 600/425 |
| 2007/0250548 A1 * | 10/2007 | Huo et al. | ...................... | 707/203 |
| 2008/0032328 A1 | 2/2008 | Cline et al. | | |

OTHER PUBLICATIONS

International Search Report cited in International Application No. PCT/US2009/062980, dated May 27, 2010, 7 pages.
Written Opinion of the International Searching Authority cited in International Application No. PCT/US2009/062980, dated May 27, 2010, 8 pages.
W.K. Pratt, "Digital Image Processing," Image Detection and Registration, (Jan. 1, 1978), Wiley, New York, pp. 562-567, 6 pages.
Williams, et al., "Cross-Correlation Digital Registration Techniques for Multispectral Cell Images," Comput. Biol. Med., vol. 8, No. 1, (1978), pp. 71-80, 10 pages.
Zitova et al., "Image Registration Methods: A Survey," Image and Vision Computing 21, (2003), 24 pages.
Lisa Gottesfeld Brown, "A Survey of Image Computing Techniques," ACM Computing Surveys, vol. 24, No. 4, (1992), pp. 325-376, 52 pages.
Ching et al., "Recognition of Partially Occluded Object,"P{roc. Tencon, Beijing IEEE (1993), pp. 930-933, 4 pages.

* cited by examiner

*Primary Examiner* — C Luke Gilligan
*Assistant Examiner* — Maroun Kanaan
(74) *Attorney, Agent, or Firm* — K&L Gates LLP; Louis C. Cullman; Andrew L. Reibman (57) ABSTRACT

In accordance with the principles of the invention, methods, systems, and computer-readable mediums are provided for positioning cellular analysis data including measuring a similarity between pixel data in a target sample data and pixel data in a template data. An offset position is determined based on the measured similarity. The pixel data in the template data is shifted based on the offset position to produce shifted template data having pixel data at shifted locations which match the corresponding pixel data in the target sample data.

16 Claims, 12 Drawing Sheets

SYSTEMS AND METHODS FOR CELLULAR ANALYSIS DATA PATTERN GLOBAL POSITIONING

CROSS-REFERENCE TO RELATED APPLICATIONS

The present application claims the benefit of U.S. Provisional Application No. 61/111,078 filed Nov. 4, 2008, which is incorporated by reference herein in its entirety.

FIELD OF THE INVENTION

Embodiments of the present invention generally relate to systems and methods of particle analysis. More specifically, embodiments relate to systems and methods for processing and displaying cellular analysis data.

BACKGROUND

In analyzing results of cellular analyzers of a target sample, physicians need to compare the results of the target sample with those of a template and further be able to analyze any abnormalities in the target sample. Conventional cellular analyzers provide for the display of non-processed graphic results in one-dimensional, two-dimensional and three-dimensional displays that only show the target sample using the unprocessed cellular analysis result data. Physicians who analyze the cellular analysis results must view the graphic results while physically comparing the image of the target sample results with the image of a template. These template images can be found in a text book or in a separate image. Alternatively, the physician can have a picture of the template image in his mind. In any case, the physician must take these two separate images and compare the two. This can be difficult because the images are possibly not on the same scale, in the same form of display, etc. This makes the process of analyzing the target sample data inconvenient, inaccurate, time-consuming, and mind-intensive. Further, the result data from the cellular analyzer is unprocessed and includes noisy, unsmooth data.

The target sample data can be segmented into separate regions containing clusters for further analysis. Each cluster can be associated with a type (or population) of cells. The segmentation process usually uses a template showing the expected locations of the cell populations in the target sample data. However, sometimes one or more populations can shift from their expected locations due to changes on the biological structure of the cell in the target sample data or modifications to the calibration of the cell analyzers. In such cases, the segmentation results can be inaccurate because the locations of the cell populations in the target sample data could be far away from default or expected locations that serve as guidance points for the segmentation process.

SUMMARY OF THE INVENTION

In accordance with the principles of the invention, as embodied and broadly described herein, a method embodiment provides for positioning cellular analysis data. The method includes measuring a similarity between pixel data in a target sample data and pixel data in a template data. An offset position is determined based on the measured similarity. Locations of pixel data in the template data are shifted based on the determined offset position to produce shifted template data having pixel data at shifted locations which match the corresponding pixel data in the target sample data.

A system embodiment of the present invention includes a similarity evaluator, an offset position calculator, and a data shifter. The similarity evaluator measures a similarity between pixel data in a target sample data and pixel data in a template data. The offset position calculator determines the offset position based on the similarity measurement. The data shifter then shifts locations of the pixel data in the template data based on the determined offset position to produce shifted template data having pixel data at shifted locations which match the corresponding pixel data in the target sample data.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated in and constitute a part of this specification, illustrate several embodiments of the invention and together with the description, serve to explain the principles of the invention, and, together with the description, explain the features and aspects of the invention.

DETAILED DESCRIPTION OF THE INVENTION

Reference will now be made in detail to the present invention, examples of which are illustrated in the accompanying drawings. Wherever possible, the same reference numbers will be used throughout the drawings to refer to the same or like parts.

Overview

Methods and systems consistent with the principles of embodiments of the present invention provide for a system that accesses target sample data representing cellular analysis result data. Once the data is accessed, the system processes the data and compares the processed target sample data with the template data. Further, the system can measure a similarity between the processed target sample data and the template data. The measured similarity can be in the form of a score that identifies whether the target sample is normal or abnormal. Further, the abnormal pattern can be flagged based on the score.

According to a feature of the present invention, if one or more cell populations in the target sample data shift from their expected locations, the similarity measurement can indicate an offset position such that moving the template data to the offset position will compensate for the shift when matching the template data and the target sample data. The expected locations of data clusters associated to cell populations can be dynamically updated for further analysis.

Cellular Analysis

The present invention can be used to analyze various types of cells, cellular components, body fluids and/or body fluid components. The present invention is particularly useful in analyzing blood samples, which include both a fluid component (serum) and a solid component (various types of cells). In particular, the invention is directed to analyzing cellular components in a blood sample, either whole blood (which contains various types of blood cells) or a cell component fraction. The present invention can also be used to analyze cells obtained from a tissue sample that are separated from connective tissue and suspended in a biologically compatible liquid medium that does not destroy the cells. The present invention can further be applied to analyze the multi-dimensional cell or particle scatter plot obtained by using conventional hematology or flow cytometry instruments. The terms "cellular analyzer" and "cellular analysis" are intended to cover at least all of the components as described herein. Further, where target sample data is recited, this term is intended to include target sample cellular analysis result data.

A feature of the present invention is that global shifting of the populations in the target sample data with respect to the template can be measured. The amount of global shifting can help to update expected locations of all populations in the template. The segmentation process can produce more accurate results accordingly.

Embodiments of the present invention provide methods and systems to calculate a global measure of shifting of biological sample data with respect to a known template. Such a measure is useful to dynamically adapt the expected location of individual cell populations in the template to match the population locations in the sample data. This information can be used to improve the automated segmentation of cell populations leading to more accurate results. In addition, a larger than usual shift can flag the presence of an abnormal sample or instrument malfunctioning. Information provided by the global positioning in normal samples can also be applied to monitor and set the instrument settings by means of statistical analysis. The methods or systems can be applied to any form of biological data that is processed in the form of a two-dimensional histogram and for which a reference pattern or template is known.

Generation of Raw Data

The body fluids and/or cellular components of body fluids and/or whole blood can be subjected to various types of analytical techniques to generate data for analysis and display in accordance with the present invention. The most common techniques involve electro-optical measurements such as, measurements of Direct Current to measure the volume of the cell size, Radio Frequency to measure the opacity of the cell, fluorescence, axial light loss, and light scatter to measure the granularity of the cell.

Target Sample Data and Template Data

The target sample data and/or the template data can be in the form of image data including, but not limited to, white blood cells (WBC), red blood cells (RBC), platelets, one-dimensional histograms from complete blood count (CBC), WBC differential scattergrams in two and/or three dimensions, reticulocyte differential scattergrams in two and/or three dimensions, nucleated red blood cell (NRBC) differential scattergrams in two or three dimensions, WBC differential histograms in surface image, reticulocyte differential histograms in surface image, and NRBC differential histograms in surface image. Alternatively the stored template data can be stored after the raw data has been applied with image smoothing and stepped image transformation.

System Architecture

Figure 1:
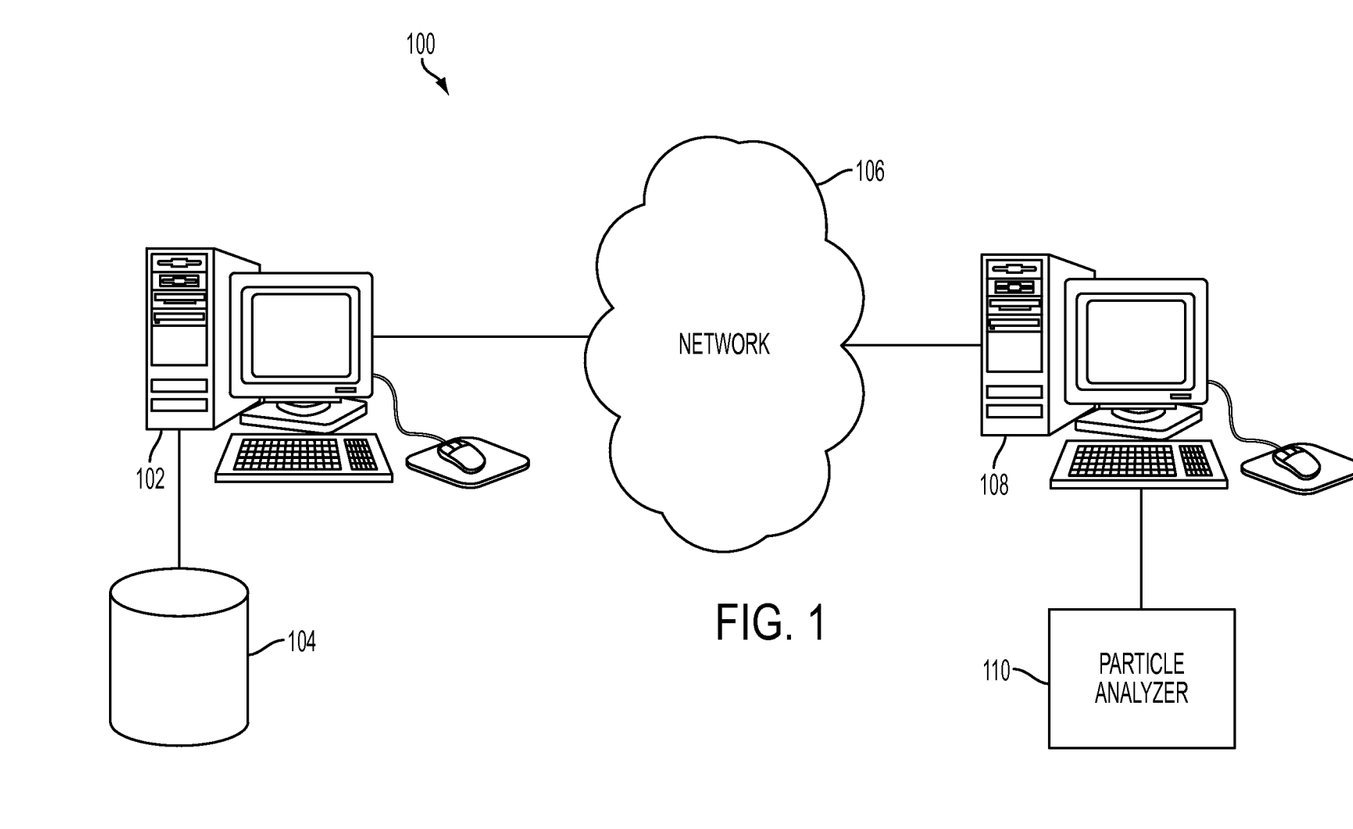
FIG. 1 is an exemplary diagram of a system environment, according to an embodiment of the present invention.

FIG. 1 is an exemplary diagram of a system environment 100 for implementing the principles of the present invention. The components of system 100 can be implemented through any suitable combinations of hardware, software, and/or firmware. As shown in FIG. 1, system 100 includes a user computer 102. User computer 102 can be communicably linked to a database 104. Alternatively, database 104 can reside on network 106 or the contents of database 104 can reside on computer 102 or server 108.

System 100 can further include network 106 which can be implemented as the Internet, or any local or wide area network, either public or private. System 100 can further include server 108 and server 108 can be communicably linked to analyzer 110. Analyzer 110 can be implemented as hematology analyzers to generate the test result data. Exemplary hematology analyzers are available from a number of companies including Beckman Coulter Inc., Sysmex Corp., Abbott Laboratories Inc., Siemens AG, and Shenzhen Mindray Bio-Medical Electronics Co., Ltd. Analyzer 110 can be implemented as a flow cytometer. Exemplary flow cytometers are available from a number of companies including Beckman Coulter Inc. and Becton, Dickinson and Company.

It would be appreciated by one of ordinary skill in the art that while only one computer 102, database 104, network 106, server 108 and analyzer 110 are depicted, more than one of these types of devices can be implemented in the system consistent with the principles of embodiments of the present invention. It would further be appreciated that each of these devices can reside in different locations within the system. For example, analyzer 110 can be directly communicably linked to computer 102, wherein computer 102 can receive data from analyzer 110 directly without operating over the network. It would still further be appreciated that features consistent with principles of the present invention can be implemented solely within computer 102 as a stand-alone unit where all of the data needed to perform the present invention can reside directly on computer 102 and wherein target sample data from analyzer 110 can be input by the user through an external device of computer 102.

Figure 2:
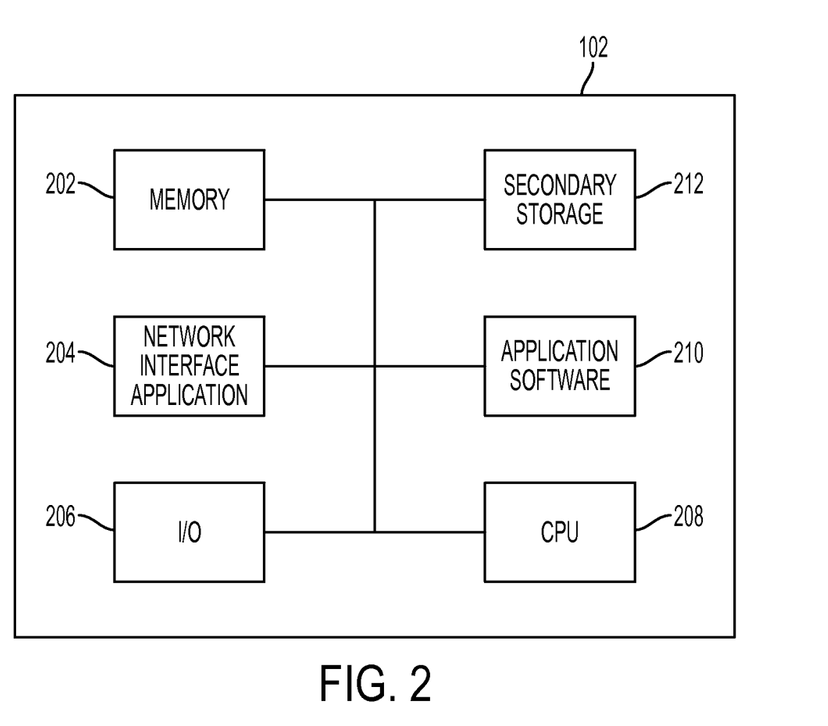
FIG. 2 is an exemplary diagram of components of a computer, according to an embodiment of the present invention.

FIG. 2 depicts an exemplary block diagram of components included in computer 102. Computer 102 can be any type of computing device, such as a personal computer, workstation, or personal computing device, and can, for example, include memory 202, network interface application 204, input/output devices 206, central processing unit 208, application software 210, and secondary storage 212. Computer 102 can be communicably linked to database 104, server computer 108 and/or analyzer 110.

A user can access network 106 using the network interface application 204, and/or application software 210. Where network 106 can be implemented as the Internet, network interface application 204 can include a conventional browser including conventional browser applications available from Microsoft, Netscape, or Google. Application software 210 can include programming instructions for implementing features of the present invention as set forth herein. Application software 210 can include programming instructions for enabling a user to view and/or analyze test result data wherein target sample data is displayed together with template data. Input/output devices 206 can include, for example, a keyboard, a mouse, a video cam, a display, a storage device, a printer, etc.

Figure 3:
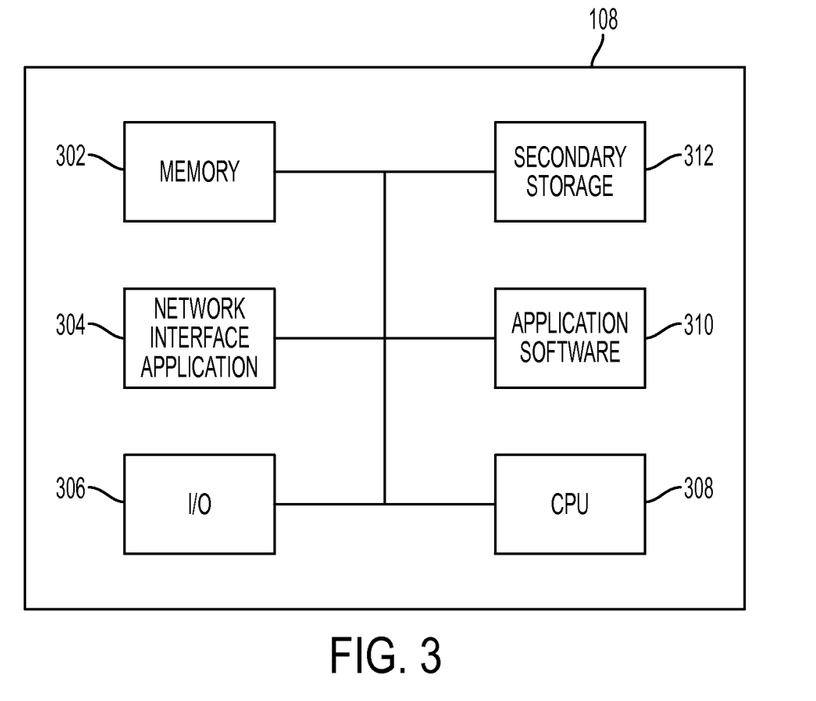
FIG. 3 is an exemplary diagram of components of a server computer, according to an embodiment of the present invention.

FIG. 3 depicts an exemplary block diagram of the components included in server computer 108. Server computer 108 can include memory 302, network interface application 304, input/output devices 306, central processing unit 308, application software 310, and secondary storage 312 consistent with the principles of some embodiments of the present invention. The components of server computer 108 can be implemented similarly with the components of computer 102.

Functionality

Figure 4:
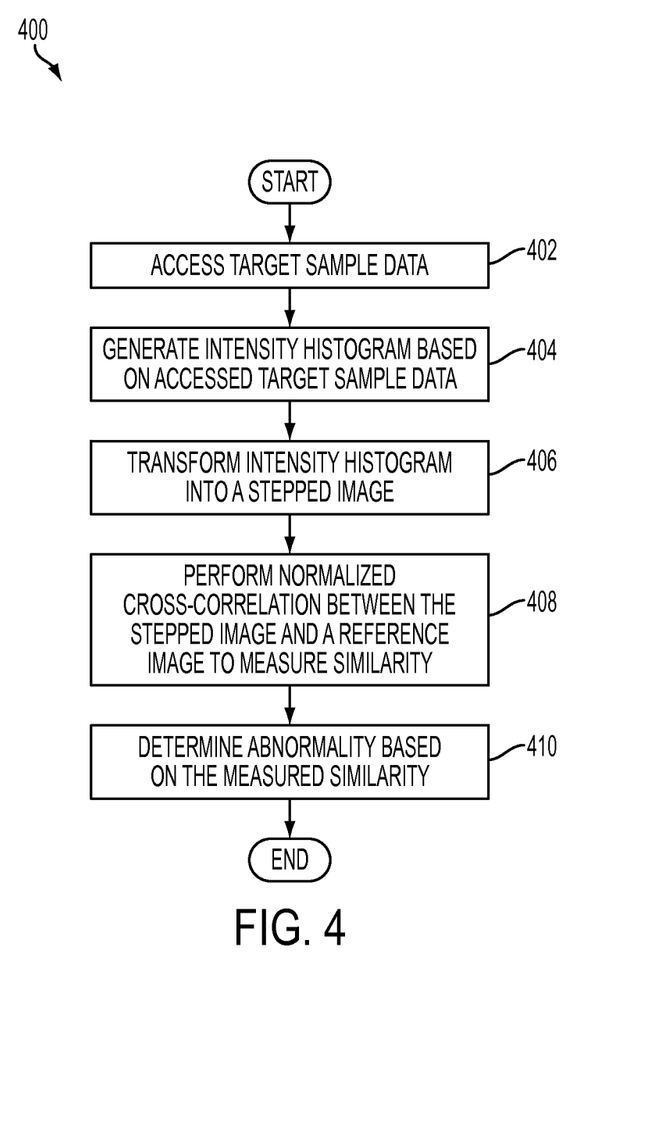
FIG. 4 depicts an exemplary flow diagram of the steps performed by a computer, according to an embodiment of the present invention.

FIG. 4 depicts an exemplary flow diagram of the steps performed by computer 102, consistent with an embodiment of the present invention. As shown in FIG. 4, upon identification of the target sample data by the user to analyze, computer 102, through application software 310, accesses target sample data (Step 402). Target sample data can be data representing analysis results of cells performed by analyzer 110. This data can be stored on computer 102, stored in database 104, or on server 108. The system then generates an intensity histogram based on the accessed target sample data (Step 404). The intensity histogram can be generated by processing the raw image data from the cellular analyzer using a filter, for example, a low pass filter, in order to remove the noise and smooth the image. A density compensation function can then be obtained, wherein the pixel values are equalized in order to improve the appearance.

The intensity histogram is then transformed by the system into a stepped image (Step 406). In order to generate the stepped image, a plurality of levels, for example, four levels, of threshold are performed to obtain the stepped image. Using the stepped image, the system performs a normalized cross-correlation between the stepped image and a reference image, or template data, to measure similarity (Step 408). This can be performed using a Fast Fourier Transform (FFT) based technique. Compared with the conventional cross-correlation algorithm, the FFT based method is more computationally efficient especially when the data size is large. Template data represents standard data to which the target sample is compared. Template data can represent, for example, an average of many samples, an average of many samples where extraneous data is removed, etc. Template data can be stored on computer 102, stored in database 104, or on server 108. The measured similarity can be in the form of a score where if the score is high, then the target sample is normal. If the score is low, or below a predetermined threshold, then the target sample is abnormal (Step 410).

Figure 7:
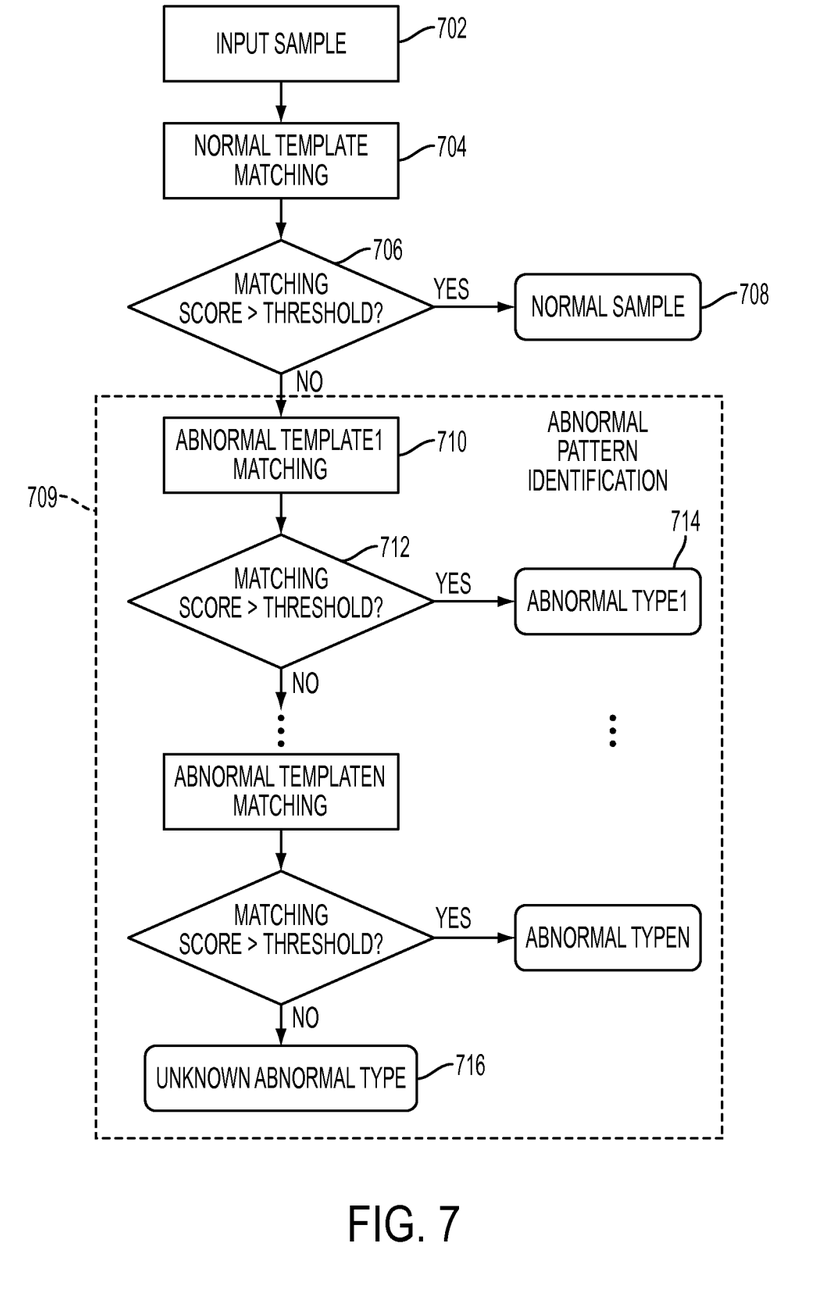
FIG. 7 depicts an exemplary flow diagram illustrating the steps performed by a computer, according to an embodiment of the present invention.

FIG. 7 depicts an exemplary flow diagram of steps performed by client computer 102 in determining correlation. Client computer 102 accesses the sample (Step 702). After the target sample is accessed, client computer 102 performs normal template matching to determine if the target sample is normal (Step 704). If the matching score between the normal template and the target sample is above a certain threshold (Step 706, Yes), then computer 102 determines that the target sample is normal (Step 708).

If the matching score between the target sample and the normal template is less than a predetermined threshold, then abnormal pattern identification is performed (709). During abnormal pattern identification, the target sample is correlated with at least one abnormal template to identify an abnormality. For example, the target sample is matched with abnormal template 1 (Step 710). If the matching score is greater than a predetermined threshold (Step 712, Yes), then the target sample is determined to have an abnormality of type 1 (Step 714). This process can be repeated for a plurality of abnormal templates. If the matching score is not greater than a predetermined threshold for any of the abnormal templates matched, then the target sample is determined to have an unknown abnormality (Step 716).

Figure 5A:
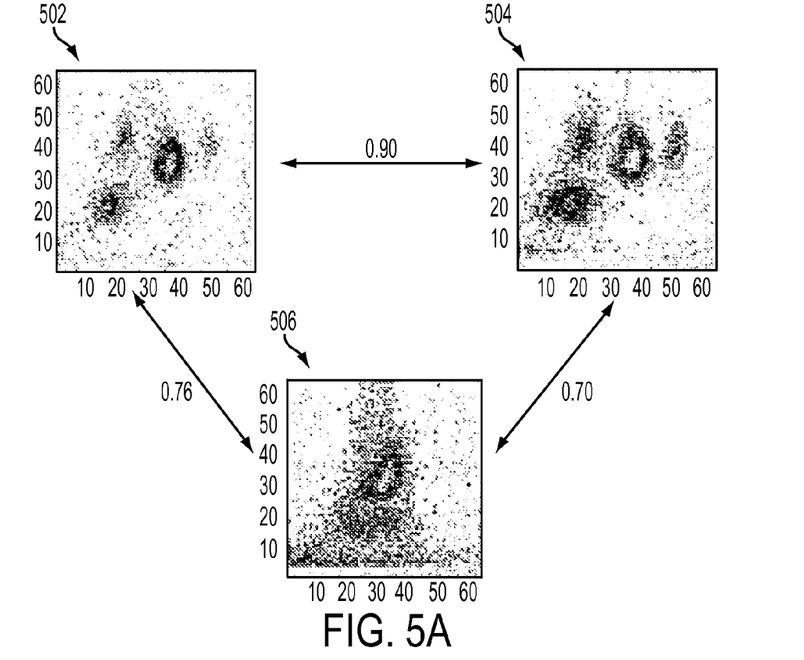
FIGS. 5(a) and 5(b) depicts exemplary displays comparing similarity measurements between original histogram images and transformed stepped images, according to an embodiment of the present invention.
Figure 5B:
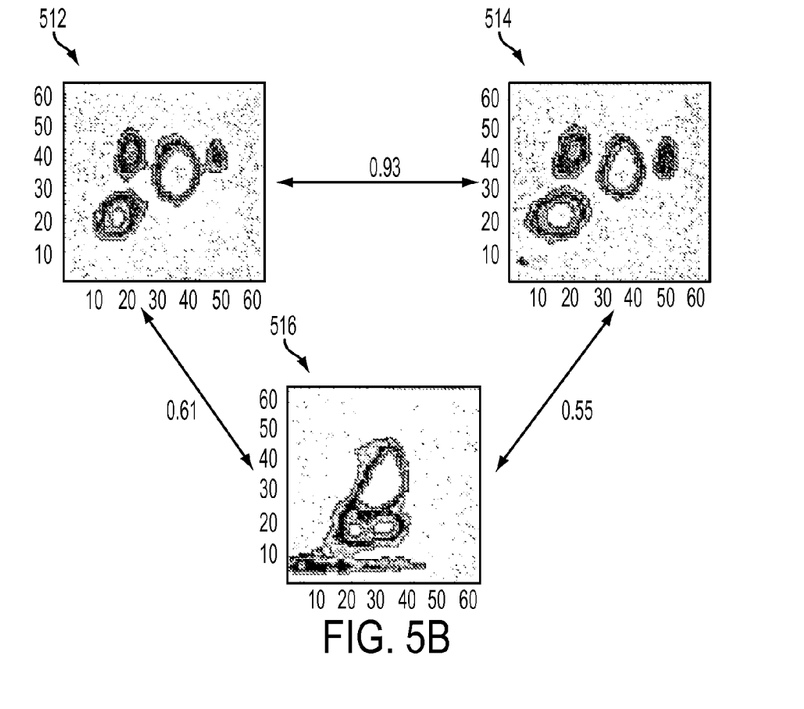

FIG. 5(a)-(b) depicts an example of the difference between original histogram data from the cellular analysis result data and the processed cellular analysis result data consistent with principles of some embodiments of the present invention. As shown in FIG. 5(a)-(b), the original histogram images are depicted in FIG. 5(a) and the transformed stepped images are depicted in FIG. 5(b). Images I and II in FIG. 5(a) both present a normal pattern. However, the intensities of each population are varied. Image III in FIG. 5(a) is a sample with an abnormal pattern. The cross-correlation coefficients which are used to measure the similarity between the two images are shown next to the arrows. FIG. 5(b) shows the results based on the transformed stepped images consistent with the principles of some embodiments of the present invention. As can be seen in the figure, the similarity measurement between the two normal samples (images I and II) is increased. In contrast, the similarity measurements between normal samples and the abnormal sample (Image III) are decreased significantly.

As can be seen from FIGS. 5(a) and (b), the stepped image transformation can compensate the intensity variation of the original images. By processing the cellular analysis result data in the manner described herein, instead of using the raw histogram images for template matching, more discriminate information can be provided between normal and abnormal patterns. Further, each level of the stepped image is a binary image. Therefore, the user can readily obtain a lot of useful image information, for example, the number of populations at a given level based on analyzing the binary images.

After processing the cellular analysis result data as discussed above, the system can display the data to the user. For example, the system can display the transformed stepped image to the user so that the user can see the processed cellular analysis result data together with the template data within the same image. This allows the user to visually see how the processed cellular analysis result data compares with the template data. This data is provided in addition to the score representing the measured similarity calculated by the system. Further, the system can display the processed target sample data and the template data. The processed target sample data can be displayed using display attribute(s) that are different from the display attributes of the template data. For example, the processed target sample data can be displayed in one color, texture, level of brightness, etc., while the template data is displayed in a different color, texture, level of brightness etc., so that the user can more easily differentiate between the two data sets. Alternatively, the user can turn on or turn off the display for the template.

Alternatively, a display can be presented to the user including the original histogram data of the cellular analysis result data.

Displays

Figure 6A:
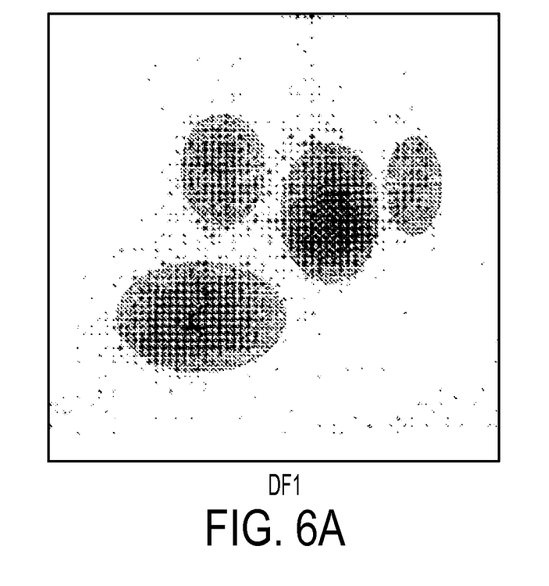
FIGS. 6(a) and 6(b) depicts an exemplary display provided to a user, according to an embodiment of the present invention.
Figure 6B:
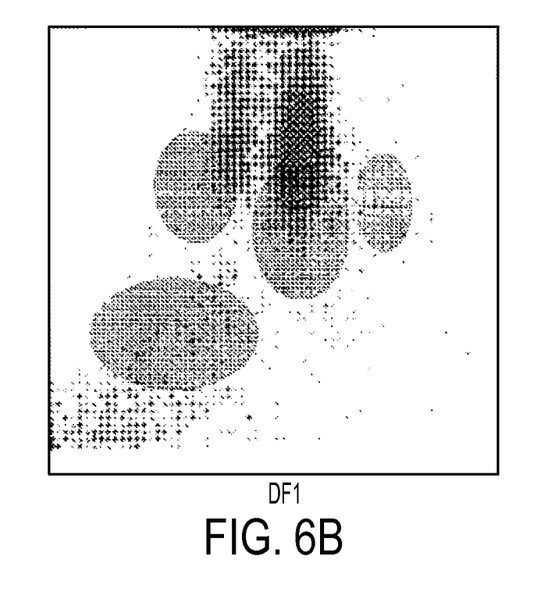

FIGS. 6(a) and (b) depict exemplary displays provided to user upon completion of the process set forth in FIG. 4. FIG. 6(a)-(b) depicts template matching between the processed cellular analysis result data and the template data. The gray shadow areas indicate the location of the normal sample template and the black dots represent the processed cellular analysis result data. FIG. 6(a) depicts a sample where there is a high matching score, indicating a normal sample. FIG. 6(b) depicts a sample with a low matching score, indicating an abnormal sample. The original figures of FIG. 6(a)-(b) can be found in U.S. patent application Ser. No. 11/408,454, filed on Apr. 21, 2006, by Z. Huo et al. and assigned to Beckman Coulter Inc., now pending, incorporated in its entirety herein by reference (US Patent Application Publication No. 2007/0250548, published Oct. 25, 2007).

Template Data

The template data used within system 100 can be standard template data or can be customizable by the physician. The template data can represent a normal and healthy sample or an abnormal sample. Standard template data is data that can be deliberately selected and processed using thousands of samples. Further, by using a present template, noise and bias can be removed and, ultimately, are more objective than that summarized by any user. Further, there can be different template data for each variable in an analysis, providing for a multi-variate or multi-parameter analysis. In addition, there can be different templates representing in one-dimensional, two-dimensional, or three-dimensional form in order to provide more data to compare with the target sample data. In order to provide the template data in accordance with the present invention, it is possible to obtain multiple specific disease templates with a current patient sample or target sample.

By providing the template data as discussed herein, the target sample can be compared with the template in order to identify abnormalities in the target sample based on, for example, special graphic patterns that can appear in the display. These abnormalities can include, but are not limited to, chronic lymphocytic leukemia (CLL), acute lymphocytic leukemia (ALL), chronic myologenous leukemia (CML), acute myologenous leukemia (AML), defects in hemoglobin, for example, Thalassemia, sickle cell crisis, etc.

Aspects of cellular analysis and display of cellular abnormality described above with respect to FIGS. 1-7 are further described in U.S. patent application Ser. No. 11/408,454, filed on Apr. 21, 2006, by Z. Huo et al. and assigned to Beckman Coulter Inc., now pending, incorporated in its entirety herein by reference (US Patent Application Publication No. 2007/0250548, published Oct. 25, 2007).

Data Pattern Global Positioning

According to a further feature, data pattern global positioning is provided. To better assist physicians and users to analyze the cellular data, the intensity histogram representing the target sample data is segmented into clusters. Each cluster can be associated to a cell type or population. The segmentation process is often guided by a template image containing expected locations of the populations. The template image can be obtained by segmenting the template data.

The distributions of the populations form a data pattern of the respective target sample data or the template image. By comparing and matching the data patterns of target sample data and the template image, a global position of the target sample data pattern can be determined. The global position is then used to estimate the amount of shifting of the target sample data with respect to the template image. This information can be used to assist the segmentation of the target sample data into corresponding populations.

For instance, when the data pattern of the target sample data shifts from its expected location, it is helpful to estimate the amount of global shifting so that the expected locations of all populations can be updated accordingly. The segmentation process can produce more accurate results accordingly.

Figure 8:
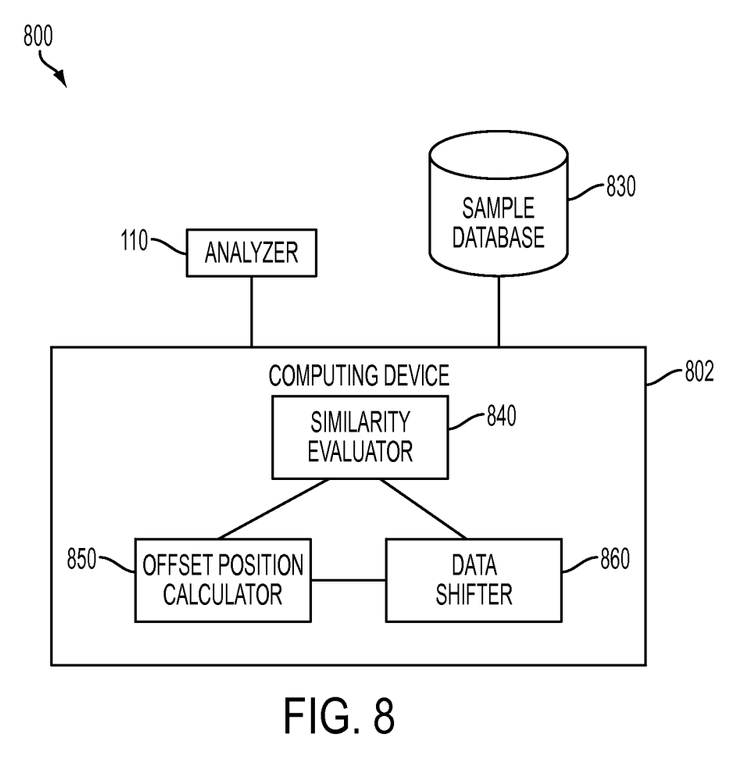
FIG. 8 is an exemplary diagram of main components of a system for data pattern global positioning according to an embodiment of the present invention.

FIG. 8 is an exemplary diagram of a system 800 for positioning the template data based on the target sample data.

In FIG. 8, system 800 includes analyzer 110, a computing device 802, and a sample database 830. Sample database 830 stores image data related to cellular analysis data including 1D, 2D, 3D and/or more dimensional intensity histograms generated from cellular samples. Sample database 830 can be implemented on a relational database management system. Examples of relational databases include Oracle, Microsoft SQL Server, and MySQL. These examples are illustrative and are not intended to limit this invention.

Example computing devices, include, but are not limited to, a computer, workstation, distributed computing system, embedded system, stand-alone electronic device, networked device, rack server, a device having at least one processor and memory, or other type of computer system. In one embodiment, computing device 802 is computer 102 of system 100.

Computing device 802 includes a similarity evaluator 840, an offset position calculator 850, and a data shifter 860. Similarity evaluator 840 measures a similarity between pixel data in target sample data and template data. For example, the pixel data can be histogram images obtained from the target sample data and template data. The pixel data can also be stepped images based on the target sample data and the template data. Other types of pixel data can also be used. Offset position calculator 850 determines an offset position based on the measured similarity. Data shifter 860 shifts the template data based on the determined offset position so that the shifted template data can match the target sample data. In further embodiments, similarity evaluator 840, an offset position calculator 850, and a data shifter 860 can be implemented on multiple computing devices coupled to one another to distribute processing work. In one embodiment, similarity evaluator 840 performs a cross-correlation between the pixel data in the target sample data and the template data. The cross-correlation can be used to measure the similarity between the target sample data and the template data. A cross-correlation image can be generated based on the cross-correlation. Offset position calculator 850 locates a pixel in the cross-correlation image having the maximum intensity. The offset position can be set as the location of the located pixel. Data shifter 860 then shifts the center of the template data to the offset position. The rest of the template data can be shifted accordingly. In this way, locations of the populations in the template data can match locations of the populations in the target sample data. The operation of computing device 802 and its components, namely, similarity evaluator 840, offset position calculator 850, and data shifter 860, is described further below with respect to FIGS. 9-12B.

Figure 9:
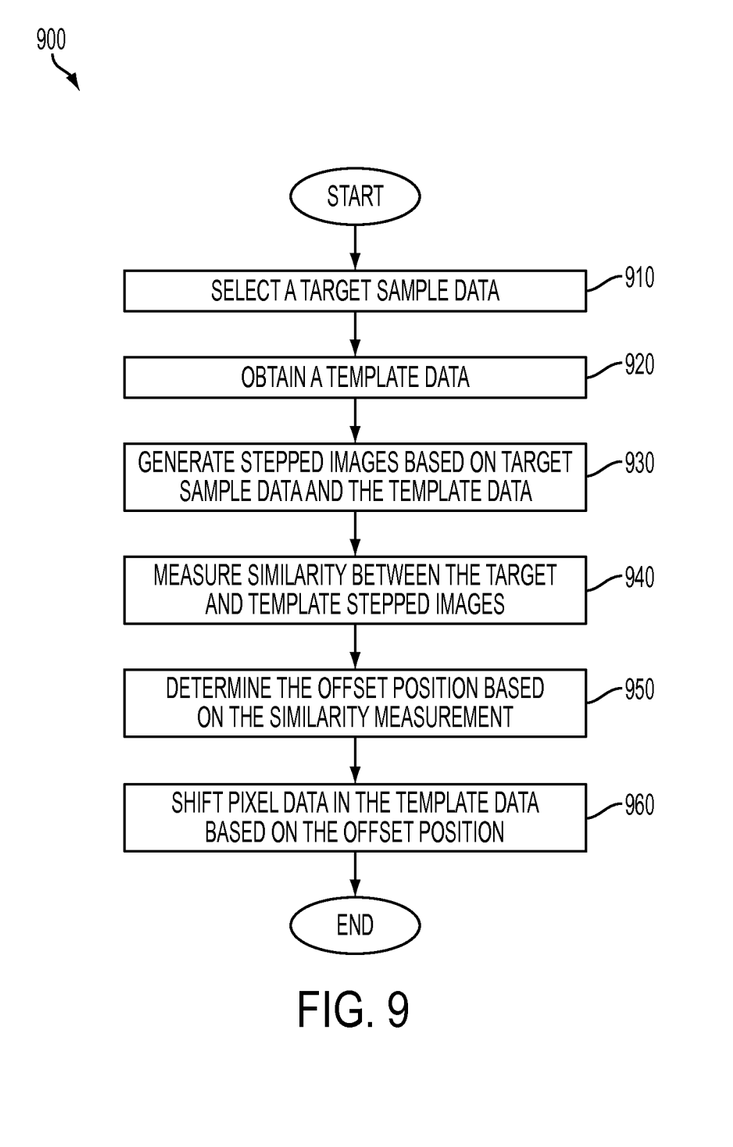
FIG. 9 depicts an exemplary flow diagram of the steps performed by the system for data pattern global positioning according to an embodiment of the present invention.

FIG. 9 depicts an exemplary flow diagram 900 of steps performed by computing device 802 in positioning template data based on target sample data (steps 910-960). Although these steps will be described for brevity with reference to system 800 shown in FIG. 8, such a procedure can be used in other systems for data pattern global positioning.

Computing device 802 first selects target sample data (step 910). In one embodiment, the target sample data is a two-dimensional histogram image corresponding to a target sample. The target sample data can be selected automatically or by a user. For example, in one embodiment, computing device 802 include a user-interface. A user can select the target sample data via the user-interface. In another embodiment, computing device 802 can automatically select the target sample data. Computing device 802 also obtains template data (step 920). In one embodiment, the template data is a two-dimensional histogram image representing above-mentioned template data. In one embodiment, the template data is data obtained from a normal sample. In another embodiment, several sample data are selected, each obtained from a different sample. The template data can be an average of different selected sample data.

Similarity evaluator 840 evaluates a similarity between pixel data in the target sample data and the template data in steps 930 and 940. In step 930, a stepped image is generated based on the target sample data and another stepped image is generated based on the template data. In order to generate a stepped image, a plurality of levels, for example, four levels, of threshold are performed to obtain the stepped image. Each level of a stepped image is a binary image.

In step 940, similarity evaluator 840 evaluates the similarity between the stepped images corresponding to the target sample data and the template data. In one embodiment, a cross-correlation is performed between the two stepped images. A cross-correlation image is generated. Each pixel in the cross-correlation image has an intensity value corresponding to a similarity score. The similarity score measures the similarity between the stepped image for the target data and a shifted stepped image for the template data. For example, in one embodiment, to compute the intensity value $I(x,y)$ at pixel $(x,y)$ in the cross-correlation image, the template stepped image is shifted to center at $(x,y)$. In this way, the center pixel of the target stepped image is compared with the pixel $(x,y)$ in the original template stepped image. In one embodiment, $I(x,y)$ is computed using the following cross-correlation equation:

$$I(x, y) = \sum_{s=-m/2}^{m/2} \sum_{t=-n/2}^{n/2} S_{target}\binom{s+m/2,}{t+n/2} \times S_{template}(x+s, y+t) \quad (1)$$

where $S_{target}$ and $S_{template}$ are the target stepped image and the template stepped image with size of m×n respectively. s and t are indexing variables for computing pixels locations in the target and template stepped images.

In one embodiment, the cross-correlation image can be generated using a method based on a Fast Fourier Transform (FFT). The FFT-based method generates the cross-correlation image by transforming the stepped images into the frequency domain, computing the cross-correlation, and performing an inverse transform. Compared with the conventional cross-correlation algorithm, the FFT based method is more computationally efficient especially when the data size is large.

In step 950, offset position calculator 850 determines a pixel location corresponding to a maximum or substantially maximum intensity value in the cross-correlation image. The maximum intensity value represents the maximum similarity between the target sample data and the template data. The determined pixel location is set as the offset position. In one embodiment, the offset position is an optimal center location for the template stepped image to most closely match the target stepped image. In an alternative embodiment, two or more pixel locations are determined based on a set highest intensity values that represent highest similarities. The offset position can be an average of the determined pixel locations. For example, in one embodiment, three pixel locations are determined corresponding to the top three intensity values in the cross-correlation image. The offset position is set as the average of these three pixel locations. This example is illustrative and not intended to limit the present invention.

In step 960, data shifter 860 shifts locations of pixel data in the template data based on the offset position. The cell population locations in the template data are shifted based on the offset position accordingly. For example, in one embodiment, if the offset position is $(q_1, q_2)$, a compensation factor to move the center of the template data $(m/2, n/2)$ to $(q_1, q_2)$ is $(q_1-m/2, q_2-n/2)$. The shifted location for a pixel $(x, y)$ in the template data will be $(x+q_1-m/2, y+q_2-n/2)$. The cell population locations in the shifted template data can most closely match the corresponding cell population locations in the target sample data.

Positioning Example

FIGS. 10A-B, 11A-B, and 12A-B show an example illustrating the steps for hematology data pattern global positioning according to an embodiment of the present invention.

Figure 10A:
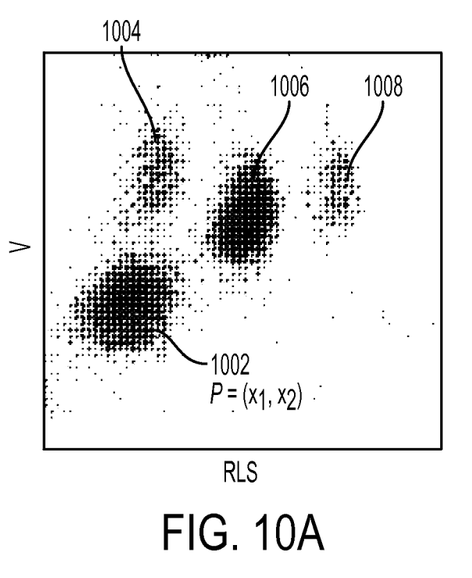
FIG. 10A is a two-dimensional histogram of a WBC differential corresponding to a normal sample, according to an embodiment of the present invention.
Figure 10B:
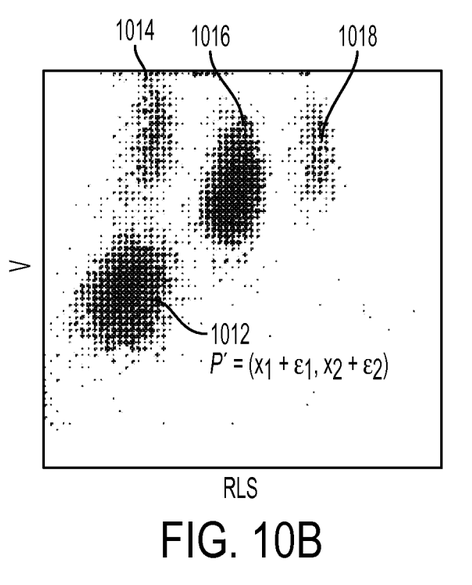
FIG. 10B is a two-dimensional histogram of a WBC differential corresponding to a shifted normal sample, according to an embodiment of the present invention.

FIG. 10A is an l×l two-dimensional RLS-Volume histogram for WBC differential. Clusters 1002, 1004, 1006, and 1008 correspond to different cell populations. The center of cluster 1002 is $P=(x_1, x_2)$. FIG. 10B is an artificially generated two-dimensional RLS-Volume histogram for WBC differential obtained by simulating an increase in the Volume gain using the same sample data corresponding to FIG. 10A. In FIG. 10B, cluster 1012 corresponds to the same cell population as cluster 1002 of FIG. 10A with a shifted location $P'=(x_1+\epsilon_1, x_2+\epsilon_2)$. Clusters 1014, 1016, and 1018 correspond to the same cell populations as clusters 1004, 1006, and 1008 respectively. Clusters 1014, 1016, and 1018 have also been shifted.

Figure 11A:
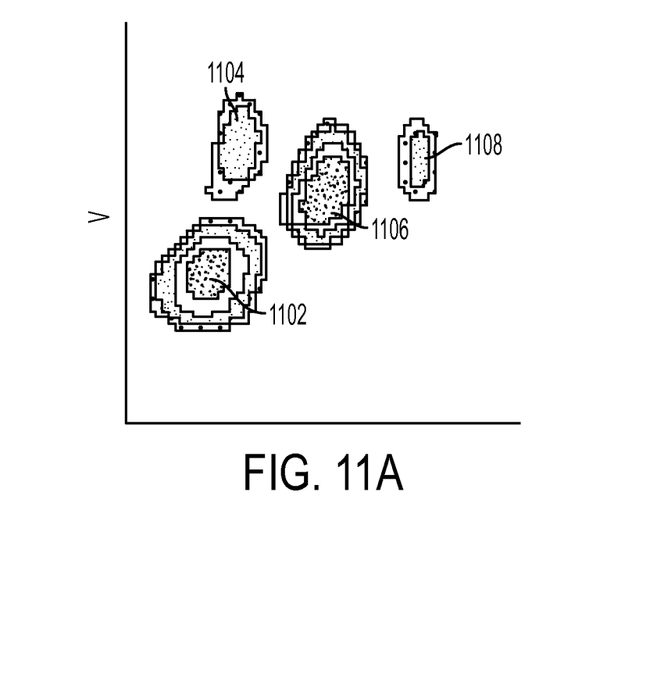
FIG. 11A is a stepped image corresponding to the histogram of FIG. 10A, according to an embodiment of the present invention.
Figure 11B:
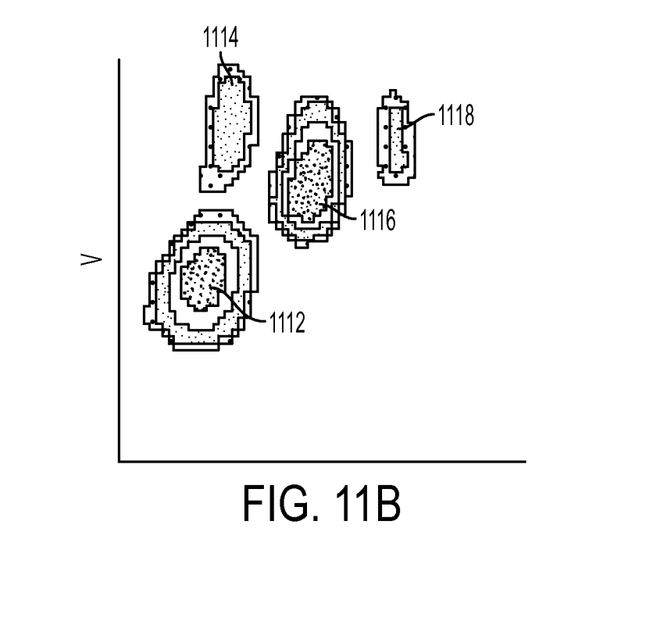
FIG. 11B is a stepped image corresponding to the histogram of FIG. 10B, according to an embodiment of the present invention.
Figure 12A:
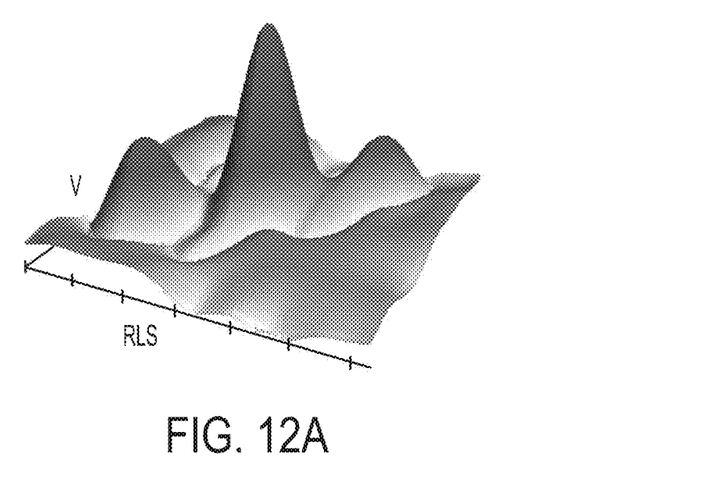
FIGS. 12A-B are cross-correlation images corresponding to FIGS. 10A-B, according to one embodiment of the present invention.
Figure 12B:
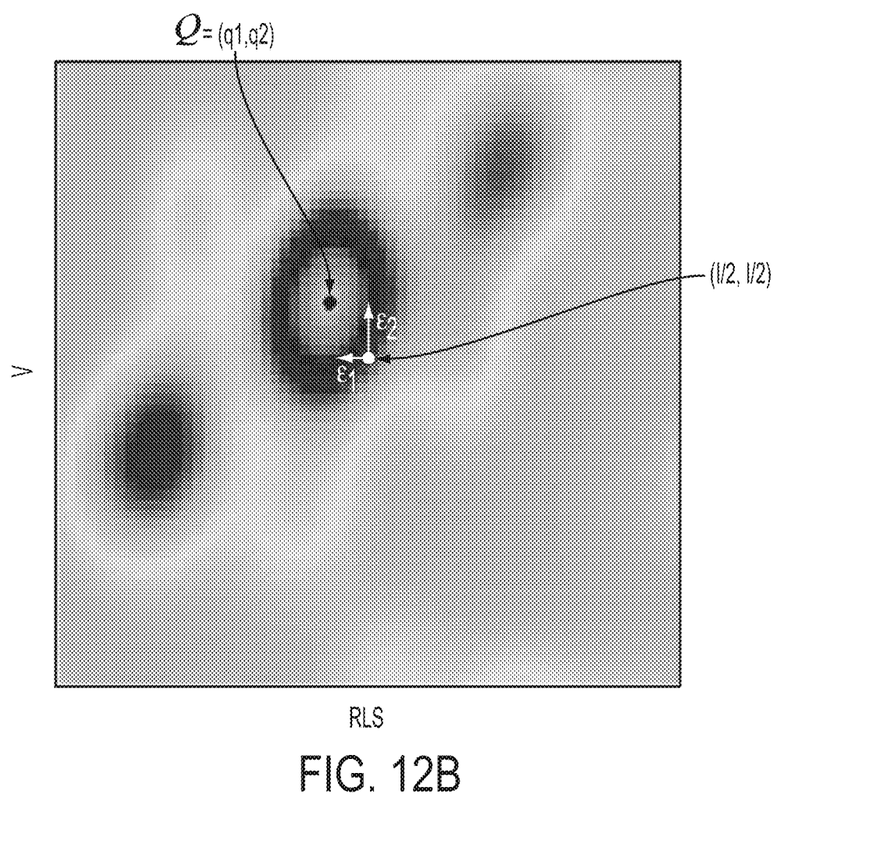

In an example, FIG. 10A is used as template data, and FIG. 10B is target sample data. To shift the template data in FIG. 10A to match FIG. 10B, stepped images corresponding to the data in FIGS. 10A-B are generated as shown in FIGS. 11A-B. In FIG. 11A, clusters 1102, 1104, 1106 and 1108 correspond to clusters 1002, 1004, 1006, and 1008 in FIG. 10A respectively. In FIG. 11B, clusters 1112, 1114, 1116, and 1118 correspond to clusters 1012, 1014, 1016, and 1018 in FIG. 10B respectively. By performing a normalized cross-correlation, a cross-correlation image is generated and shown in FIGS. 12A-B. FIG. 12A is a 3D form with the height dimension corresponding to intensity of the two-dimensional cross-correlation image in FIG. 12B. The pixel with the maximum intensity value, $Q=(q_1, q_2)$, is located. The compensation factor $(\epsilon_1, \epsilon_2)$ can be calculated by $$\epsilon_1 = q_1 - l/2$$

$$\epsilon_2 = q_2 - l/2 \quad (2)$$

These values can be used to dynamically update the locations of the cell populations to handle shifting of the data pattern. In one embodiment, the value of $(\epsilon_1, \epsilon_2)$ considered if the maximum intensity value of the cross-correlation image is above a predefined threshold. In one embodiment, when using a normal template data, the maximum intensity threshold is 0.7 for a normal target sample. The target sample is abnormal if the maximum intensity is below 0.7 and above 0.3. A maximum intensity value below 0.3 can indicate an instrument malfunction. The similarity measurement can be further put into a system log for a service reference. These examples are illustrative and are not intended to limit the present invention.

In this way, a global measure of shifting of biological sample data with respect to a known template can be calculated. Based on such a measure, expected locations of individual cell populations in the template can be dynamically adapted to match population locations in the sample data. This information can be used to improve automated segmentations of cell populations leading to more accurate results. In addition, the similarity measurement can also be used to monitor and set instrument settings by means of statistical analysis.

Modifications and adaptations of the present invention will be apparent to those skilled in the art from consideration of the specification and practice of the invention disclosed herein. The foregoing description of an implementation of the invention has been presented for purposes of illustration and description. It is not exhaustive and does not limit the invention to the precise form disclosed. Modifications and variations are possible in light of the above teachings or can be acquired from the practicing of the invention. For example, the described implementation includes software, but systems and methods consistent with the present invention can be implemented as a combination of hardware and software or hardware alone.

Additionally, although aspects of the present invention are described for being stored in memory, one skilled in the art will appreciate that these aspects can also be stored on other types of computer-readable media, such as secondary storage devices, for example, hard disks, floppy disks, or CD-ROM; or other forms of RAM or ROM.

What is claimed is:

1. A method for positioning with at least one computing device multiparameter cellular analysis data from a particle analyzer, comprising:
   (a) using the at least one computing device, performing a cross-correlation between pixel data in a target sample data and pixel data in a template data to measure a similarity between pixel data in the target sample data and pixel data in the template data, wherein the target sample data represents values of at least two different measured parameters for a set of cells that have been analyzed with the particle analyzer, and wherein the template data represents values of the same at least two parameters for a cell population of a known type;
   (b) generating a cross-correlation image based on the performed cross correlation, wherein pixels in the cross-correlation image have intensities depending on the similarity between the pixel data in the target sample data and the pixel data in the template data;
   (c) using the at least one computing device, determining a pixel location in the cross-correlation image corresponding to a substantially maximum intensity in the cross-correlation image and setting an offset position based on the pixel location; and
   (d) using the at least one computing device, shifting locations of the pixel data in the template data with respect to at least one of the at least two different measured parameters based on the offset position to produce shifted template data having pixel data at shifted locations that match the corresponding pixel data in the target sample data.

2. The method of claim 1, wherein performing a cross-correlation further comprises:
   (1) generating a first stepped image based on the target sample data;
   (2) generating a second stepped image based on the template data; and
   (3) performing a normalized cross-correlation between the first and second stepped images.

3. The method of claim 1, wherein step (c) further comprises comparing the substantially maximum intensity to a predetermined threshold and setting the offset position as the pixel location when the substantially maximum intensity is greater than the predetermined threshold.

4. The method of claim 1, further comprising:
   (e) selecting one or more sample data from a plurality of sample data representing normal patterns of the cellular analysis data, each obtained from a biological sample; and
   (f) generating the template data based on an average of the respective selected sample data.

5. The method of claim 1, further comprising logging the measured similarity.

6. The method of claim 1, further comprising:
   receiving the target sample data from a particle analyzer, the particle analyzer further comprising a hematology analyzer or a flow cytometer.

7. The method of claim 6, wherein the target sample data includes particle scatter plot data.

8. The method of claim 1, further comprising:
   causing the target sample data and the shifted template data to be displayed together to a user on a display.

9. The method of claim 1, wherein the target sample data and template data include at least one of particle volume data, particle opacity data, particle fluorescence data, particle axial light loss data, particle light scatter data.

10. A system for positioning multiparameter cellular analysis data from a particle analyzer, comprising:
    at least one processor;
    at least one memory in communication with the processor, the at least one memory storing a plurality of instructions configured, when executed by the at least one processor, to cause the at least one processor to
    (a) generate a cross-correlation image by performing a cross-correlation between the pixel data in a target sample data and pixel data in a template data, wherein the target sample data represents values of at least two different measured parameters for a set of cells that have been analyzed with the particle analyzer and the template data represents values of the same at least two parameters for a cell population of known type, and wherein pixels in the cross correlation image have intensities depending on similarities between the pixel data in the target sample data and the pixel data in the template data;
    (b) measure a similarity between the target sample data and the template data based on the cross-correlation;
    (c) determine a position corresponding to a substantially maximum intensity in the cross-correlation image;
    (d) set the offset position based on the determined position; and
    (e) shift locations of the pixel data in the template data with respect to at least one of the at least two different measured parameters based on the offset position to produce shifted template data having pixel data at shifted locations that match the corresponding pixel data in the target sample data.

11. The system of claim 10, wherein the instructions are further configured to cause the at least one processor to:

(i) generate a first stepped image based on the target sample data and a second stepped image based on the template data;
(ii) perform a normalized cross-correlation between the first and second stepped images;
(iii) create a cross-correlation image based on the normalized cross correlation; and
(iv) evaluate the similarity between the target sample data and the template data based on the normalized cross-correlation.

12. The system of claim 10, wherein the instructions are further configured to cause the at least one processor to receive the target sample data from a particle analyzer, the particle analyzer further comprising a hematology analyzer or a flow cytometer.

13. The system of claim 12, wherein the target sample data includes particle scatter plot data.

14. The system of claim 10, wherein the instructions are further configured to cause the at least one processor to cause the target sample data and the shifted template data to be displayed together to a user on a display.

15. The system of claim 10, wherein the target sample data and template data include at least one of particle volume data, particle opacity data, particle fluorescence data, particle axial light loss data, particle light scatter data.

16. A computer program product for positioning multiparameter cellular analysis data from a particle analyzer, comprising a non-transitory computer readable storage medium having computer readable program code embodied in the medium, wherein said program code, when executed by at least one computer system, causes the at least one computer system to perform the steps of:

(a) performing a cross-correlation between pixel data in a target sample data and pixel data in a template data to measure a similarity; and generating a cross-correlation image based on the performed cross correlation, wherein the target sample data represents values of at least two different measured parameters for a set of cells that have been analyzed with the particle analyzer, and the template data represents values of the same at least two parameters for a cell population of a known type, and wherein pixels in the cross-correlation image have intensities depending on the similarity between the pixel data in the target data and the pixel data in the template data;

(b) determining a pixel location in the cross-correlation image corresponding to a substantially maximum intensity in the cross-correlation image and setting an offset position based on the pixel location; and (c) shifting locations of the pixel data in the template data based on the determined offset position with respect to the at least one of the at least two different measured parameters to produce a shifted template data having pixel data at shifted locations that match the corresponding pixel data in the target sample data.

* * * * *